(12) United States Patent  
Tamarkin

(10) Patent No.: US 7,651,333 B2
(45) Date of Patent: Jan. 26, 2010

(54) TACTILE CELL MODEL

(76) Inventor: Dawn A. Tamarkin, 45 Manitoba St., Springfield, MA (US) 01108

( * ) Notice: Subject to any disclaimer, the term of this patent is extended or adjusted under 35 U.S.C. 154(b) by 658 days.

(21) Appl. No.: 11/279,458

(22) Filed: Apr. 12, 2006

(65) Prior Publication Data
US 2007/0243511 A1 Oct. 18, 2007

(51) Int. Cl.
G09B 23/00 (2006.01)
(52) U.S. Cl. .................................................. 434/295
(58) Field of Classification Search ................ 434/276, 434/278, 280, 295, 296, 365, 262, 267
See application file for complete search history.

(56) References Cited

U.S. PATENT DOCUMENTS

| 1,478,058 | A | 12/1923 | Pope |
| 2,218,078 | A | 10/1940 | Assmuth |
| 2,302,934 | A | 11/1942 | Barol |
| 3,296,714 | A | 1/1967 | Klotz |
| 3,445,940 | A | 5/1969 | Dziulak |
| 4,031,635 | A | 6/1977 | Brandt |
| 4,184,271 | A | 1/1980 | Barnett, Jr. |
| 5,055,259 | A | 10/1991 | Inoue |
| 5,158,461 | A | 10/1992 | Sulway |
| 5,934,969 | A | 8/1999 | Rehkemper |
| 5,941,712 | A * | 8/1999 | Smith .......................... 434/365 |
| 5,944,532 | A | 8/1999 | Lienhop |
| 6,062,866 | A | 5/2000 | Prom |
| 6,280,199 | B1 * | 8/2001 | Baker .......................... 434/295 |
| 2007/0292830 | A1 * | 12/2007 | Ribeiro et al. .............. 434/295 |

* cited by examiner

Primary Examiner—Kurt Fernstrom
(74) Attorney, Agent, or Firm—Michael A. Blake

(57) ABSTRACT

A tactile biological cell model comprising: a plurality of organelle models configured to be manipulated by hand and arranged on a generally flat surface; where the plurality of organelle models are further configured to be arranged with respect to each other so as to represent the arrangement of a plurality of organelles of an actual biological cell. A tactile biological cell model kit comprising: a cell membrane model; a cell wall model; a central vacuole membrane model; a nucleus model; a plurality of chloroplast models; a plurality of amyloplast models; a plurality of chromoplast models; a plurality of coccus bacteria models; a plurality of bacillus bacteria models; and where each of the models are configured to be manipulated by hand and arranged on a generally flat surface with respect to each other so as to represent the arrangement of a plurality of organelles of an actual biological cell. A tactile biological cell model kit comprising: a plurality of organelle models; and where each of the organelle models are configured to be manipulated by hand and arranged on a generally flat surface with respect to each other so as to represent the arrangement of a plurality of organelles of an actual biological cell.

3 Claims, 24 Drawing Sheets

TACTILE CELL MODEL

TECHNICAL FIELD

The present invention relates to biological models, and more particularly to biological models of cells and cell structures.

BACKGROUND

Most biology classes teach the detailed structure of cells and students learn about different cell types. Cells do not come in one size or shape. Cells are almost as diverse as the life forms on our planet. When students first attempt to view cells and recognize them under the microscope, they often find them hard to understand—the microscopic world is new to them. They may be unable to decipher individual cells, let alone tell the different cell types apart. Thus cell models have been made available for use by students. However, the current models available for teaching cell biology are static; that is their components, if any, cannot be changed, and they lack tactile qualities. These currently available models may lead to the students inferring that the cells themselves are static and all the same.

Therefore, there is a need for cell models that overcome the above listed and other drawbacks.

SUMMARY

The disclosed invention relates to a tactile biological cell model comprising: a plurality of organelle models configured to be manipulated by hand and arranged on a generally flat surface; where the plurality of organelle models are further configured to be arranged with respect to each other so as to represent the arrangement of a plurality of organelles of an actual biological cell.

The disclosed invention also relates to a tactile biological cell model kit comprising: a cell membrane model; a cell wall model; a central vacuole membrane model; a nucleus model; a plurality of chloroplast models; a plurality of amyloplast models; a plurality of chromoplast models; a plurality of coccus bacteria models; a plurality of bacillus bacteria models; and where each of the models are configured to be manipulated by hand and arranged on a generally flat surface with respect to each other so as to represent the arrangement of a plurality of organelles of an actual biological cell.

In addition, the disclosed invention relates to a tactile biological cell model kit comprising: a plurality of organelle models; and where each of the organelle models are configured to be manipulated by hand and arranged on a generally flat surface with respect to each other so as to represent the arrangement of a plurality of organelles of an actual biological cell.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Figure 1:
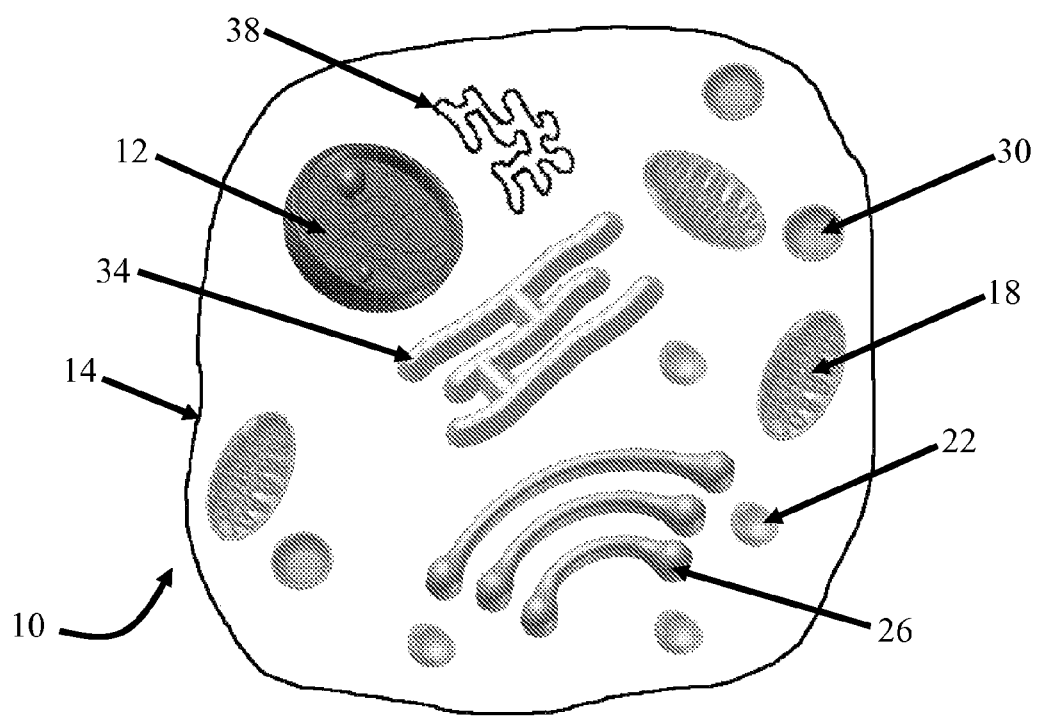
FIG. 1 is a top view of a disclosed tactile cell model.

FIG. 1 shows a top view of a disclosed tactile cell model 10. This particular tactile cell model 10 is a representation of an animal cell. Other cell types are included in this disclosure, including, but not limited to: cheek cell, elodea cell, and onion cell. The tactile cell model 10 comprises various organelle models that make up the cell. All the organelle models are tactile, that is, the student, or any other user, can touch, hold, and move the organelle models thereby giving the student a better and tactile understanding of the cell and cell structures. The organelle models shown in this particular cell model 10 comprise: a nucleus model 12, a cell membrane model 14, a plurality of mitochondria model 18, a plurality of vesicle models 22, a plurality of golgi models 26, a plurality of lysosome models 30, a rough endoplasmic reticulum model 34, and a smooth endoplastic reticulum model 38. The cell membrane model 14 may comprise bendable wire covered in plastic or fabric.

Figure 2:
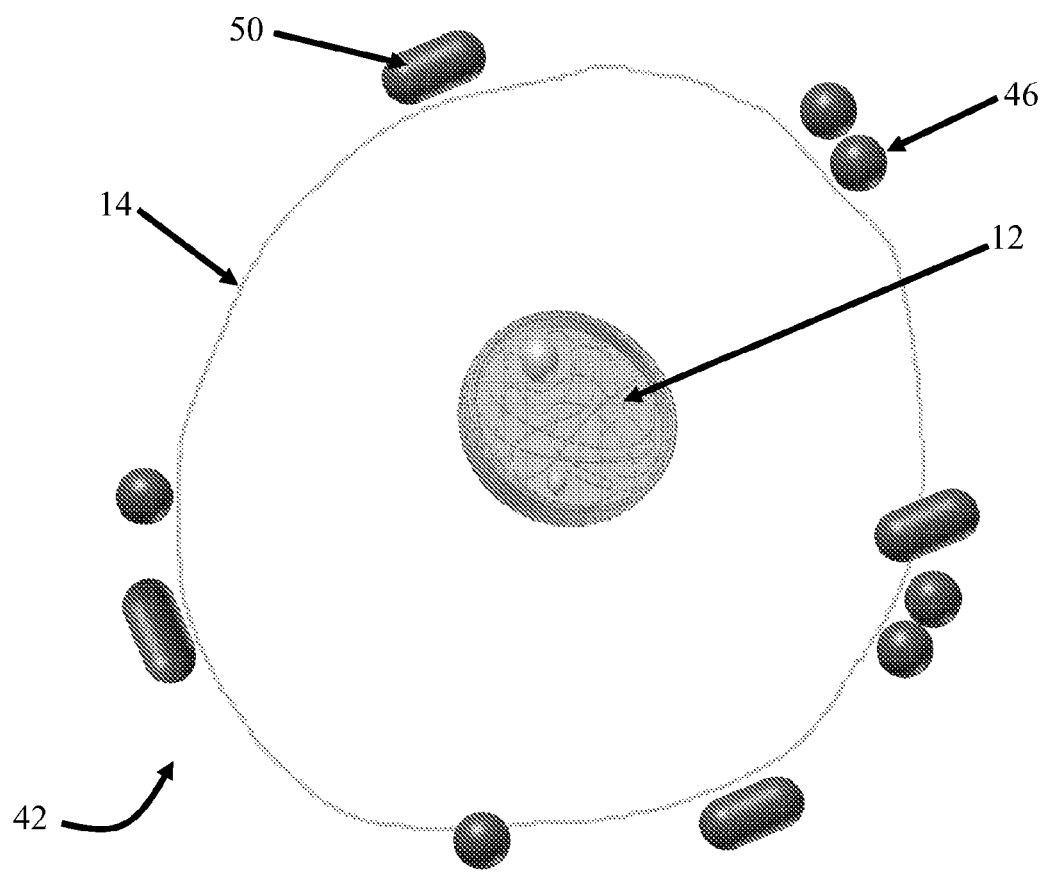
FIG. 2 is a top view of another disclosed tactile cell model.

FIG. 2 shows a top view of another disclosed tactile cell model 42. This particular tactile cell model 42 is a representation of a human cheek cell. The tactile cell model 42 comprises: a nucleus model 12, a cell membrane model 14, a coccus bacteria model 46 attached to the cell membrane model 14, and a bacillus bacteria model 50 attached to the cell membrane model 14.

Figure 3:
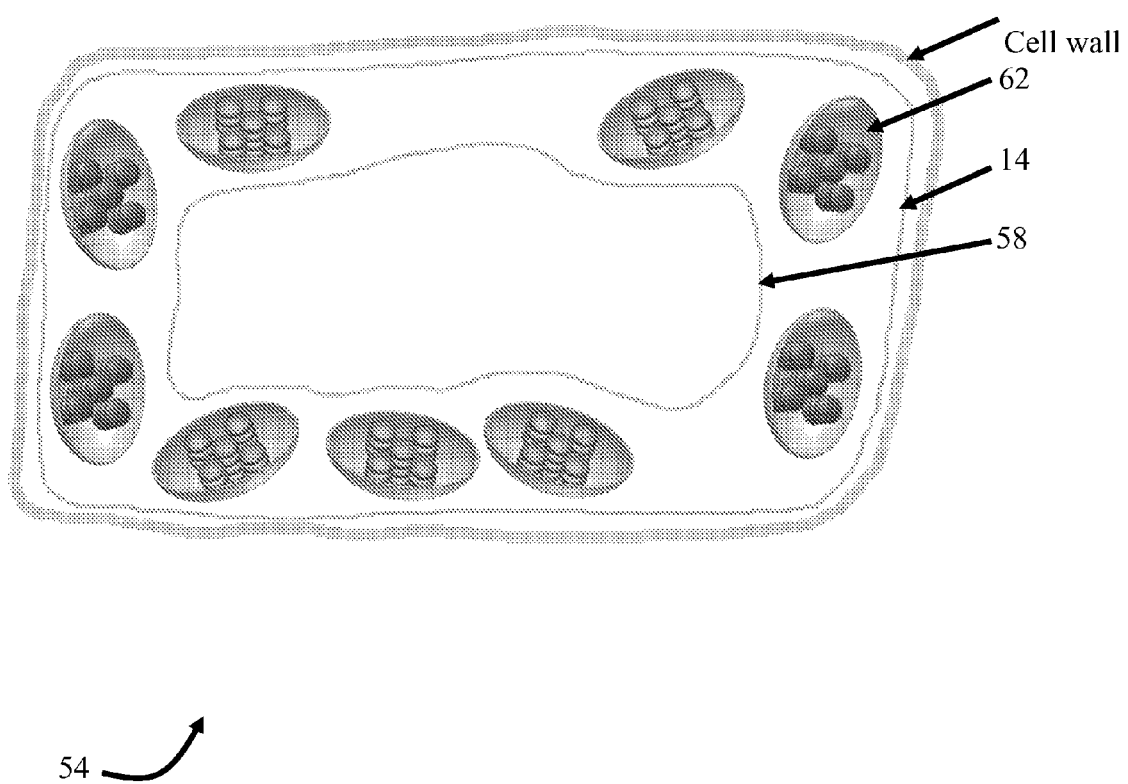
FIG. 3 is a top view of another embodiment of a disclosed tactile cell model.

FIG. 3 shows a top view of another embodiment of a disclosed tactile cell model 54. This particular tactile cell model 54 is a representation of a elodea cell as may be seen under a laboratory microscope. The tactile cell model 54 comprises: a cell membrane model 14, a central vacuole model 58, a plurality of chloroplast models 62, and a cell wall 63. The vacuole model 58, similar to the cell membrane model 14, may comprise a bendable wire covered in plastic or fabric.

Figure 4:
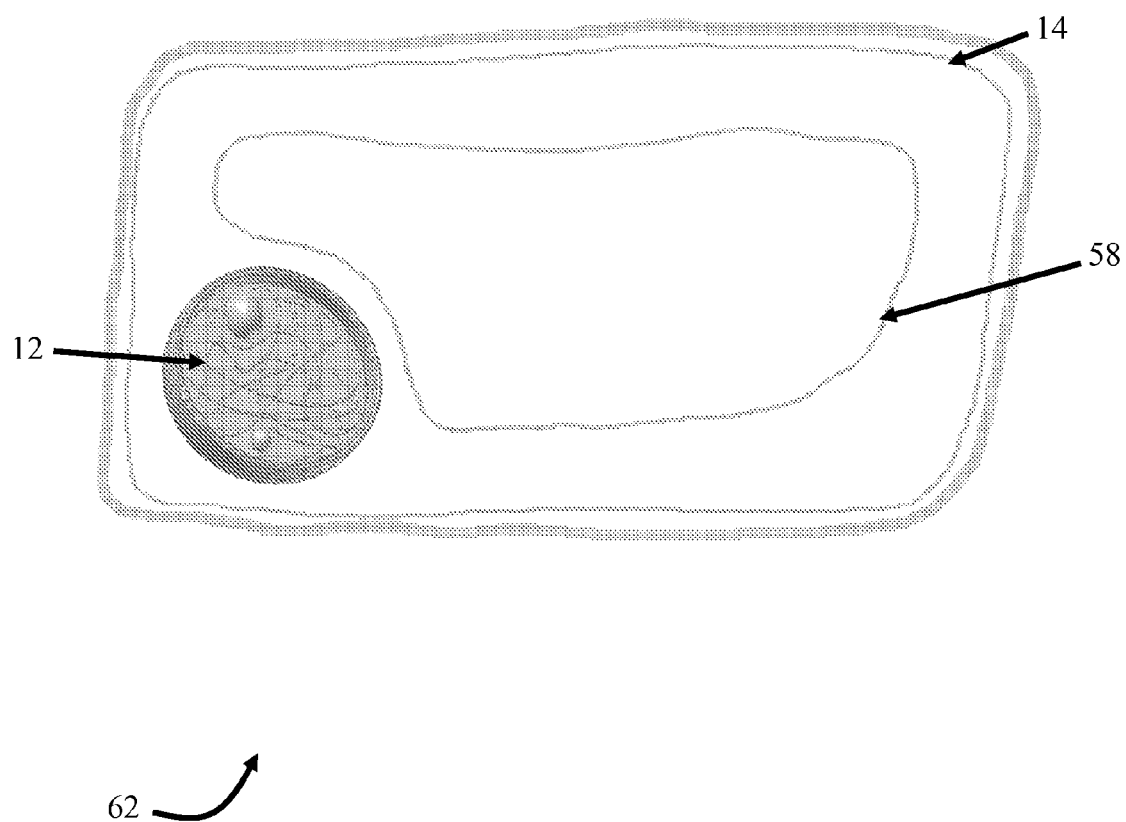
FIG. 4 is a top view of another still another embodiment of a disclosed tactile cell model.

FIG. 4 shows a top view of another still another embodiment of a disclosed tactile cell model 62. This particular tactile cell model 62 is a representation of an onion cell. The tactile cell model 62 comprises: a nucleus model 12, a cell membrane model 14, and a central vacuole model 58.

The cell models shown in FIGS. 1 through 4 comprise various organelle models that may be placed on a generally flat surface, such as, but not limited to a table, desk, or floor. The organelle models may be touched, arranged, moved an otherwise manipulated by students to assist those students in learning about the cells and the cell organelles.

Figure 5:
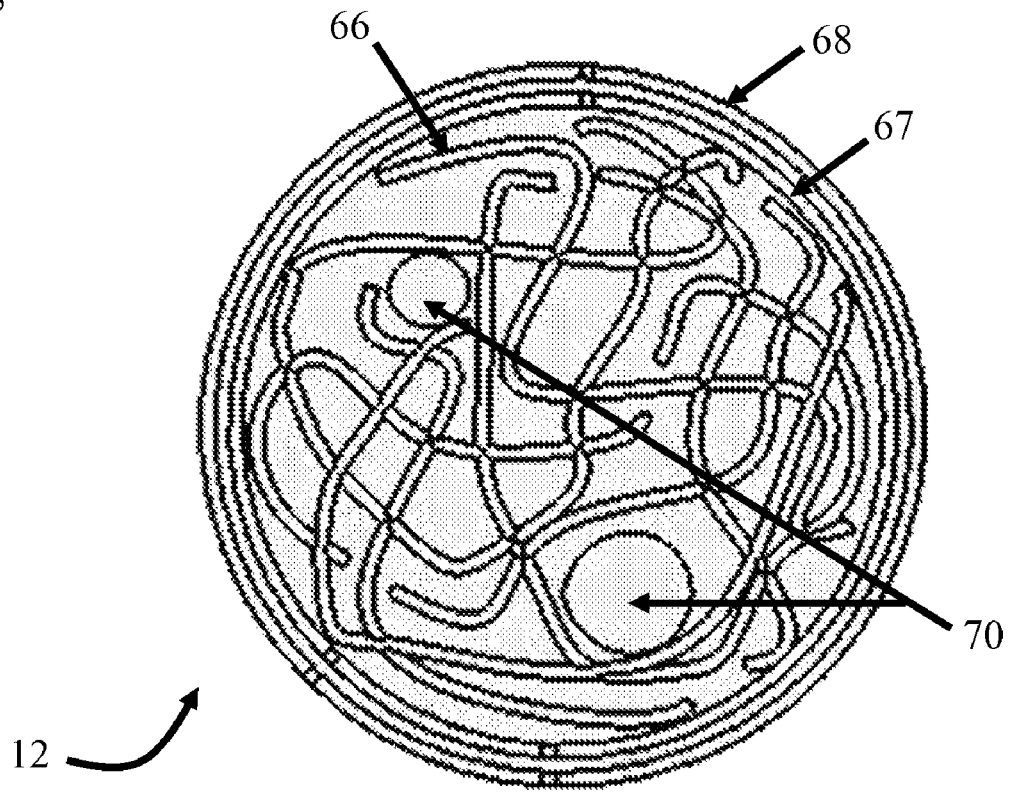
FIG. 5 is a detailed top view of a nucleus model.
Figure 6:
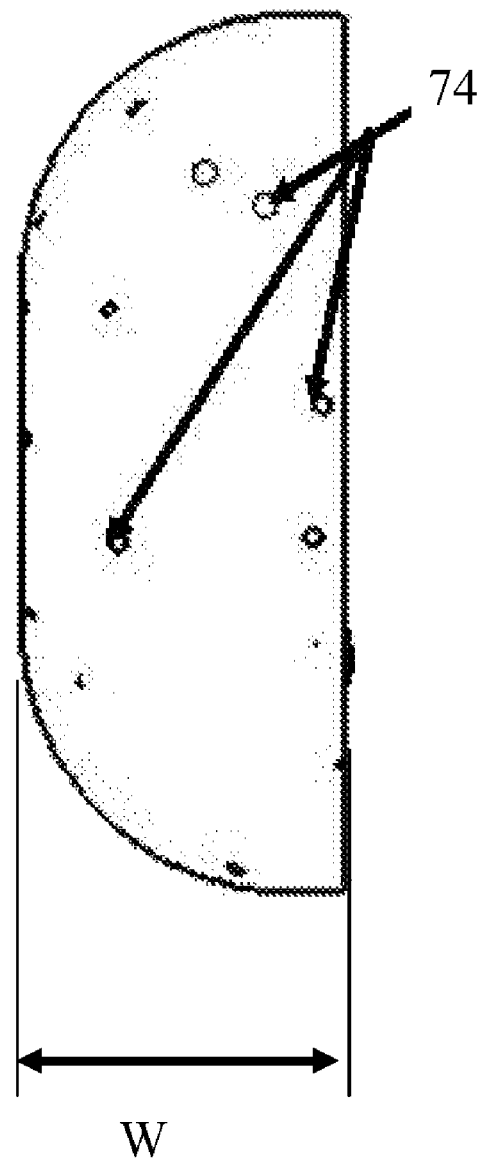
FIG. 6 is a side view of the nucleus model from FIG. 5.

FIG. 5 shows a detailed top view of a nucleus model 12. The radius of the nucleus model 12 may be about 1 inch to about 6 inches, and preferably about 3.25 inches. The nucleus model 12 is made out of a plastic material. A plurality of chromatin 66 and one or more nucleolus 70 are shown formed in the plastic material of the nucleus model 12. There is also an inner membrane 67, and an outer membrane 68. FIG. 6 shows a side view of the nucleus model 12. The nucleus comprises a plurality of nuclear pores 74. The nucleus has a width "w" of about 0.5 inches to about 5 inches, and preferably about 2.4 inches.

Figure 7:
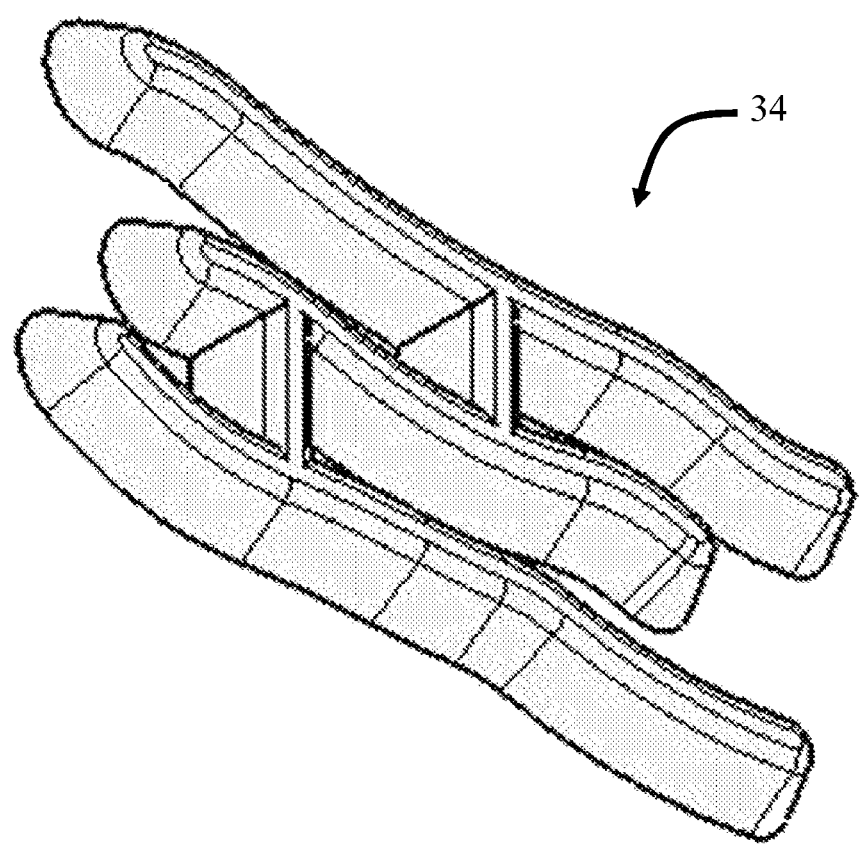
FIG. 7 is a perspective view of a rough endoplasmic reticulum model.

FIG. 7 shows a perspective view of a model rough endoplasmic reticulum model 34.

Figure 8:
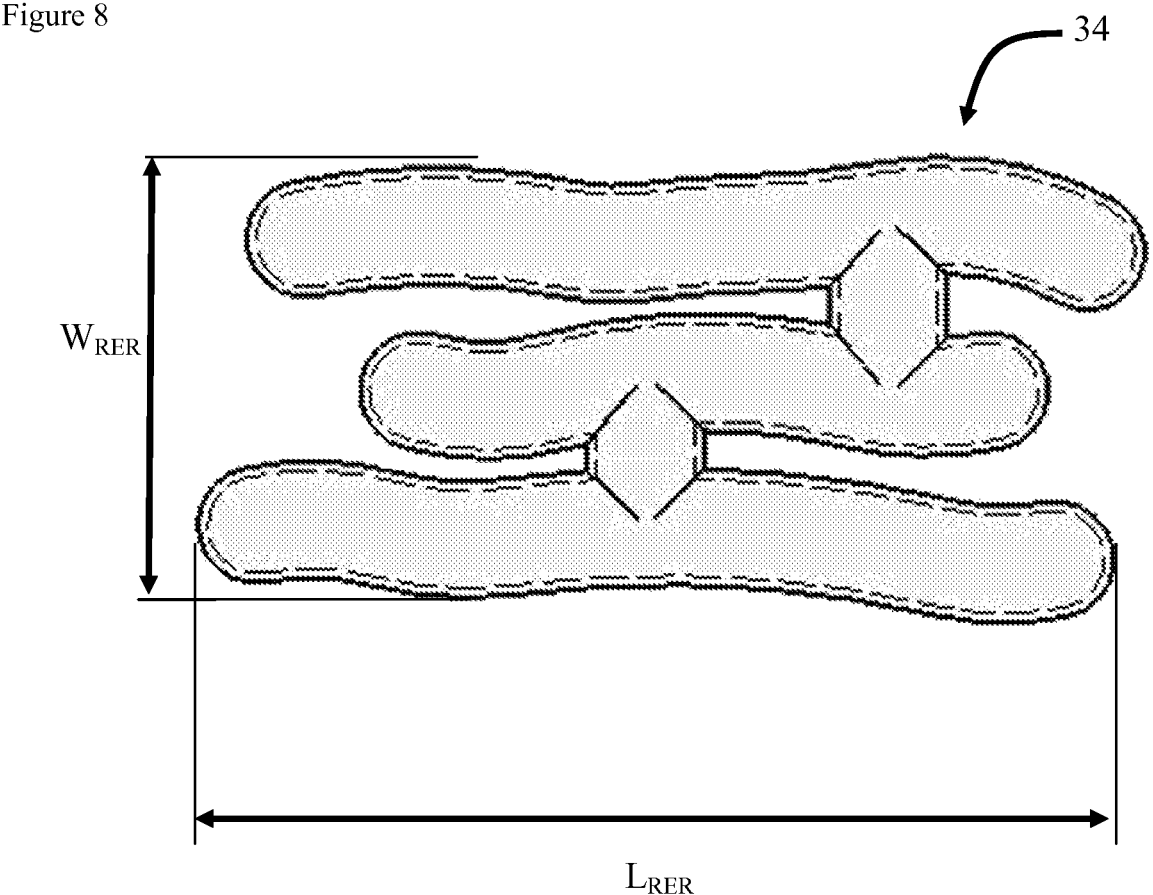
FIG. 8 is a top view of the rough endoplasmic reticulum model from FIG. 7.

FIG. 8 shows a top view of the rough endoplasmic reticulum model 34. The length "$L_{RER}$" of the rough endoplasmic reticulum model 34 is about 7 inches to about 28 inches, and preferably about 14¼ inches. The width "$W_{RER}$" of the endoplasmic reticulum model 34 is about 3.5 inches to about 14 inches, and preferably about 7 inches.

Figure 9:
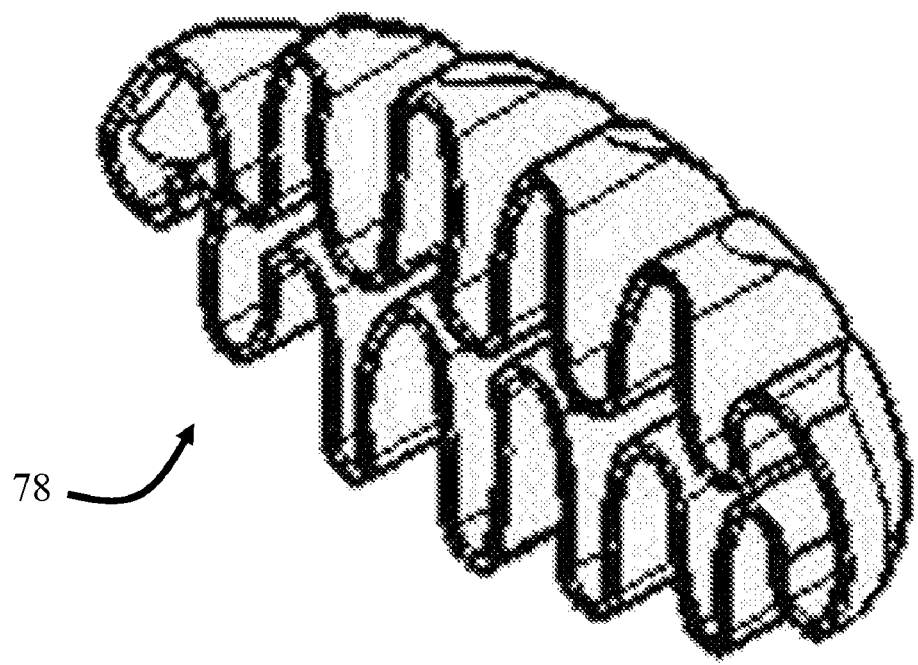
FIG. 9 is perspective view of the inner structure a mitochondria model.
Figure 10:
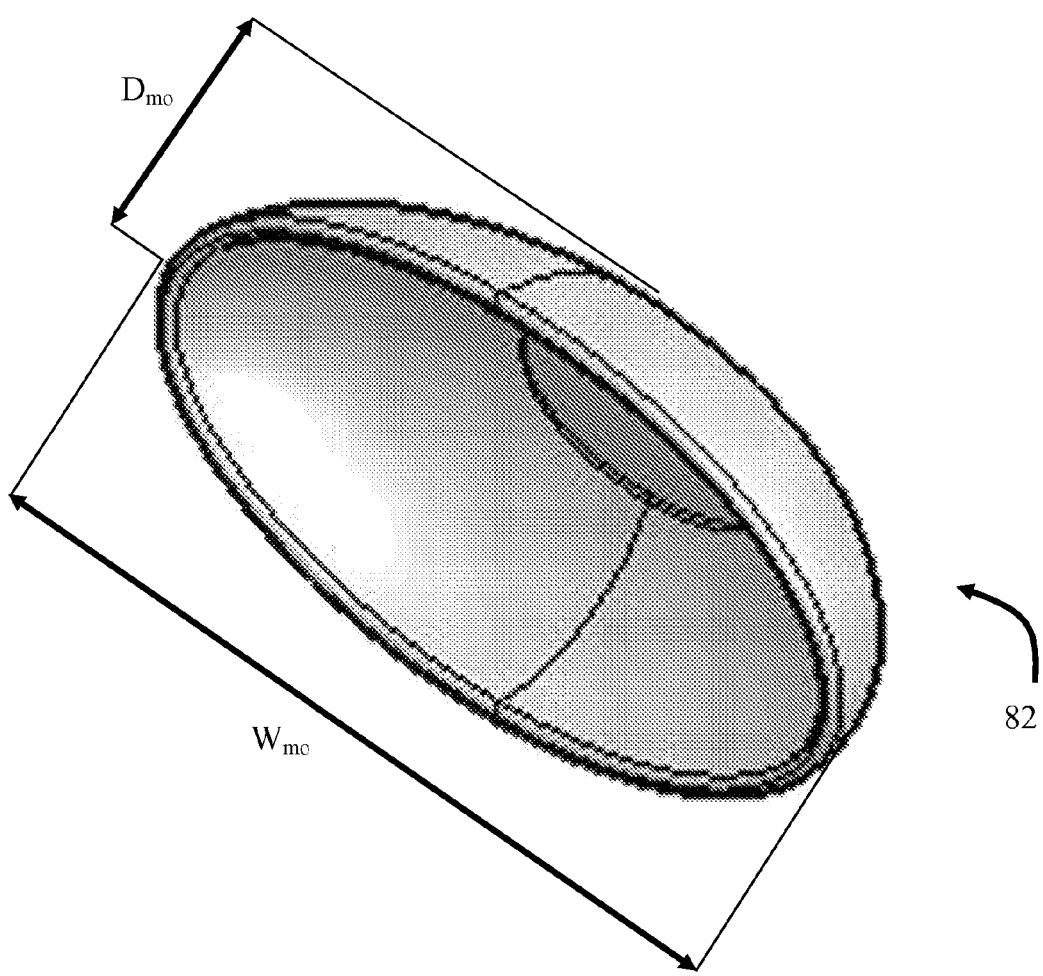
FIG. 10 is a perspective view of the outer structure of the mitochondria model from FIG. 9.

The mitochondria model 18 from FIG. 1 is shown in FIGS. 9 through 10. The inner structure 78 of the mitochondria model 18 is shown in perspective in FIG. 9. A perspective view of the outer structure 82 of the mitochondria model 18 is shown in FIG. 10. The width "$W_{MO}$" is about 2.5 inches to about 11 inches, and preferably about 5⁄1;4 inches. The depth "$D_{MO}$" is about ¼ inch to about 3 inches, and preferably about 1⁄1;2 inches. The inner structure 78 will be configured to fit into the outer structure 82.

Figure 11:
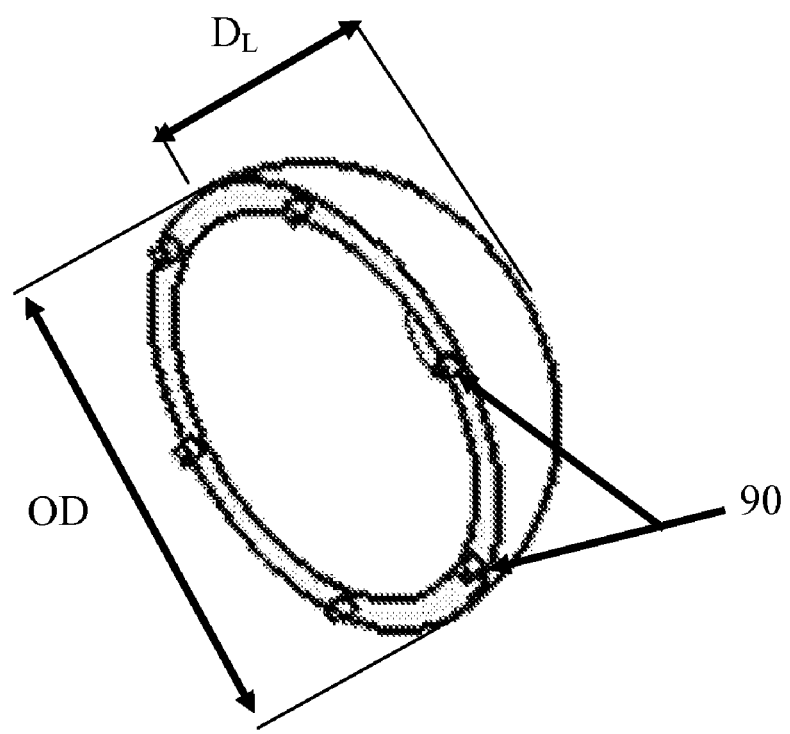
FIG. 11 shows a perspective view of a lysosome male piece model.
Figure 12:
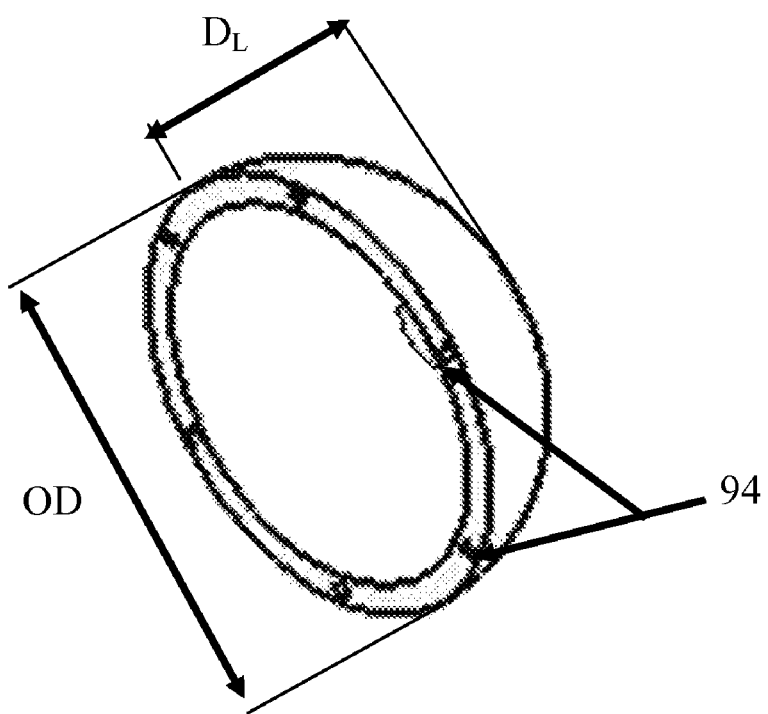
FIG. 12 shows a perspective view of a lysosome female piece model.

The lysosome model 30 from FIG. 1 is shown in FIGS. 11 and 12. The lysosome model 30 comprises two pieces, a male piece 86 shown in FIG. 11 and a female piece 90 shown in FIG. 12. The male piece 86 is configured to removeably snap into the female piece 90. The male piece 86 has a plurality of pins 90 configured to fit in a plurality of opening 94 located on the female piece. The lysosome model 30 may have an outer diameter of about ¼ inch to about 3 inches, and preferably about ½ inches. The male piece 86 and female piece 90 may have a depth "$D_L$" of about 1.4 inch to about 1⁄1;2 inch, and preferably about ⅗ of an inch.

Figure 13:
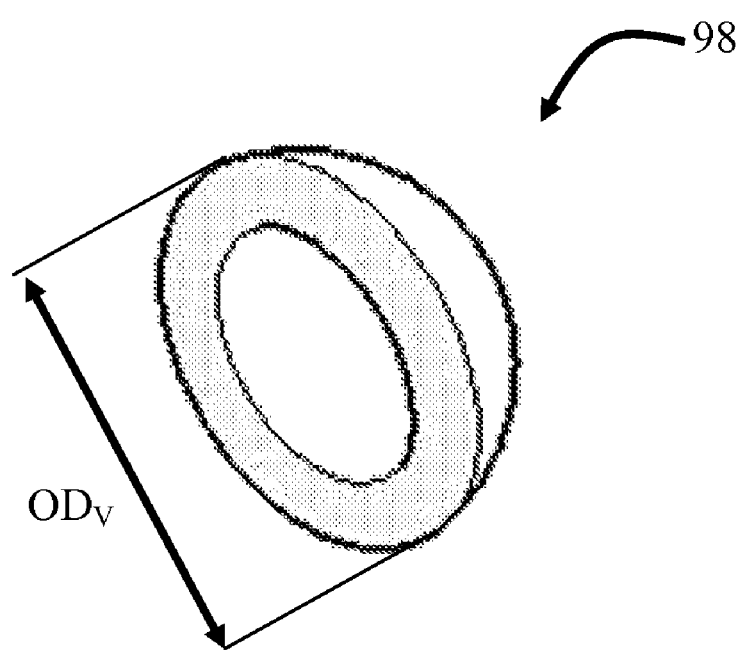
FIG. 13 shows a perspective view of a vesicle model.

FIG. 13 shows a perspective view of a vesicle model 98. The vesicle has an outer diameter "$OD_V$" of about ¼ inch to about 1⁄1;2 inch, and preferably about ¾ inch.

Figure 14:
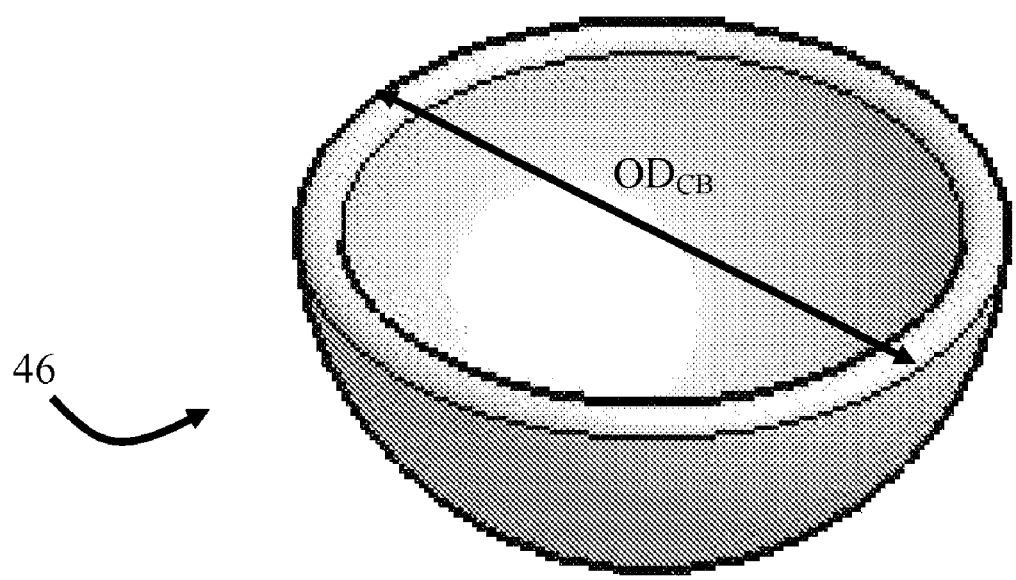
FIG. 14 shows a perspective view of a coccus bacteria model.

FIG. 14 shows a perspective view of a coccus bacteria model 46 from FIG. 2. The coccus bacteria model 46 has an outer diameter "$OD_{CB}$" of about ½ inch to about 4 inches, and preferably about 2 inches.

Figure 15:
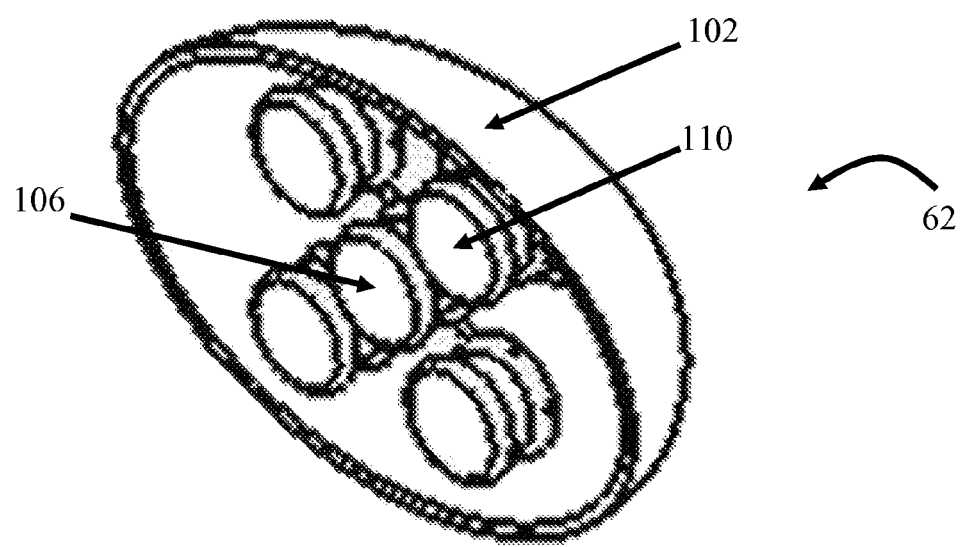
FIG. 15 shows a perspective view of a chloroplast model.
Figure 16:
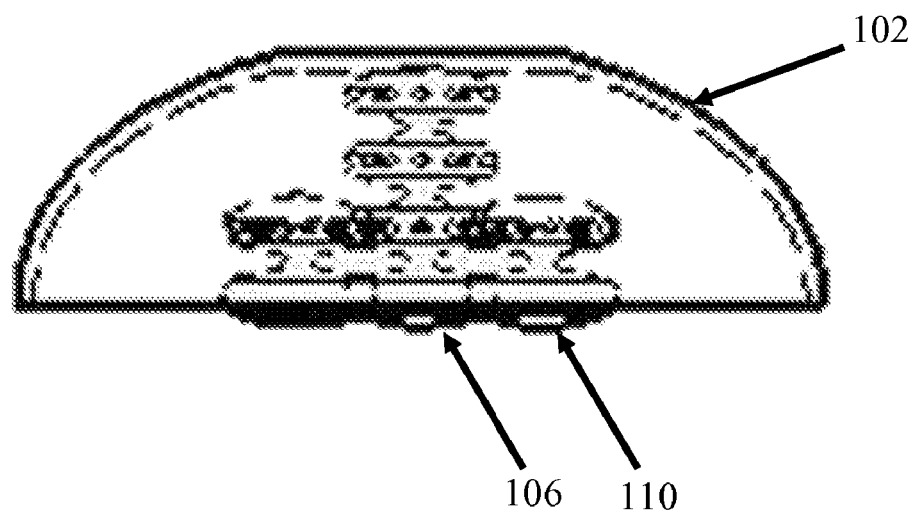
FIG. 16 shows a cross-sectional view of the chloroplast model from FIG. 15.

FIG. 15 shows a perspective view of a chloroplast model 62 from FIG. 3. FIG. 16 shows a sectional view of the chloroplast model 62. The chloroplast model 62 comprises an outer shell 102, an inner 4-section structure 106, and one or more inner 2-section structures 110.

Figure 17:
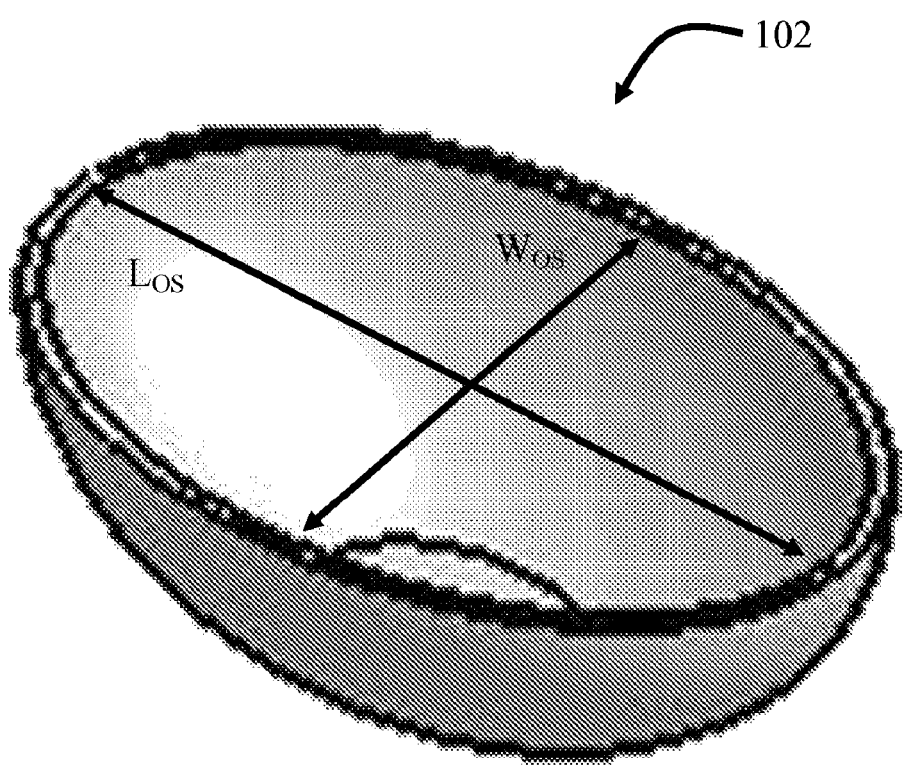
FIG. 17 shows a perspective view of the outer membrane of the plastid models, for use in making the amyloplasts, chromoplasts and chloroplasts (as shown in FIG. 15)
Figure 18:
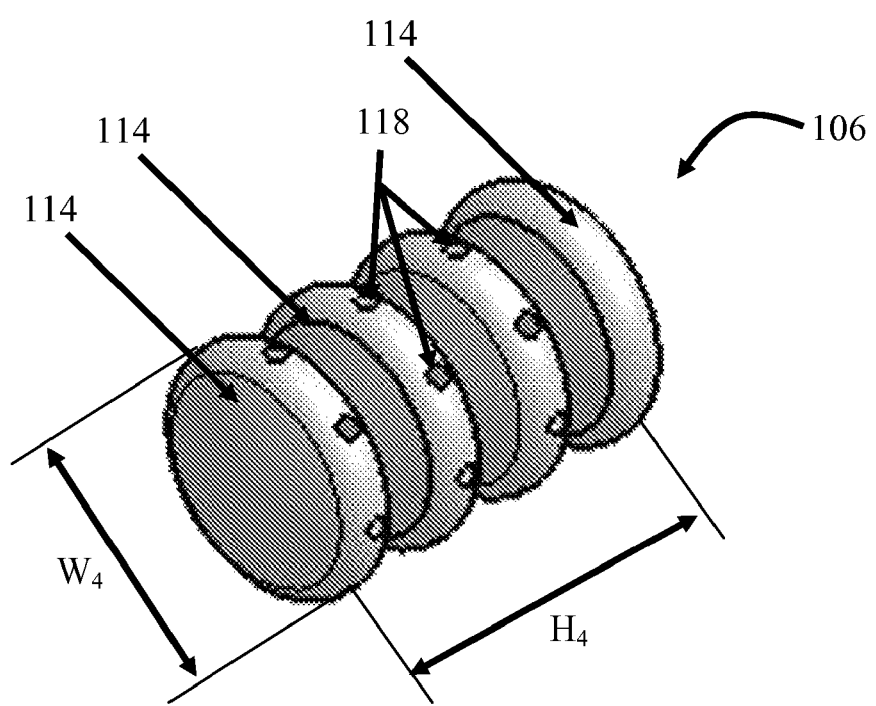
FIG. 18 shows a perspective view of the inner 4-section structure of the chloroplast model from FIG. 15.
Figure 19:
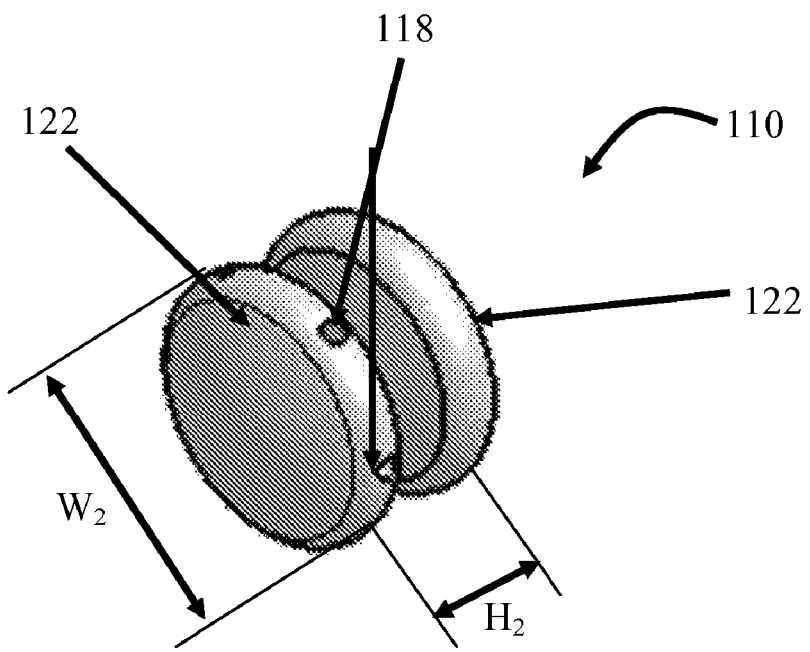
FIG. 19 shows a perspective view of the inner 2-section structure of the chloroplast model from FIG. 15.

FIG. 17 shows a perspective view of the outer shell 102. The outer shell may have width "$W_{OS}$" of about 2 inches to about 8 inches, and preferably about 4 inches. The outer shell 102 may have a length "$L_{OS}$" of about 3 inches to about 12 inches, and preferably about 6 inches. FIG. 18 shows a perspective view of the inner 4-section structure 106. The inner 4-section structure 106 comprises four discs 114. Three of the four discs may have a plurality of holes 118. The inner 4-section structure may have a height "$H_4$" of about 1 inch to about 4 inches, and preferably about 2 inches. The inner 4-section structure 106 may have a width "$W_4$" of about ½ inch to about 2 inches, and preferably about 1 inch. FIG. 19 shows a perspective view of the inner 2-section structure 110. The inner 2-section structure 110 comprises 2 discs 122. One of the discs may have a plurality of holes 118. The inner 2-section structure 110 may have a height "$H_2$" of about ½ inch to about 2 inches, and preferably about 1 inch. The inner 2-section structure 110 may have a width "$W_{2" \, of \, about}$" ½ inch to about 2 inches, and preferably about 1 inch. The inner 4-section structure 106 is configured to be removeably connectable with the inner 2-section structure 110 via pins that are insertable in the holes 118 of the inner 4-section structure 106 and the inner 2-section structure 110.

Figure 20:
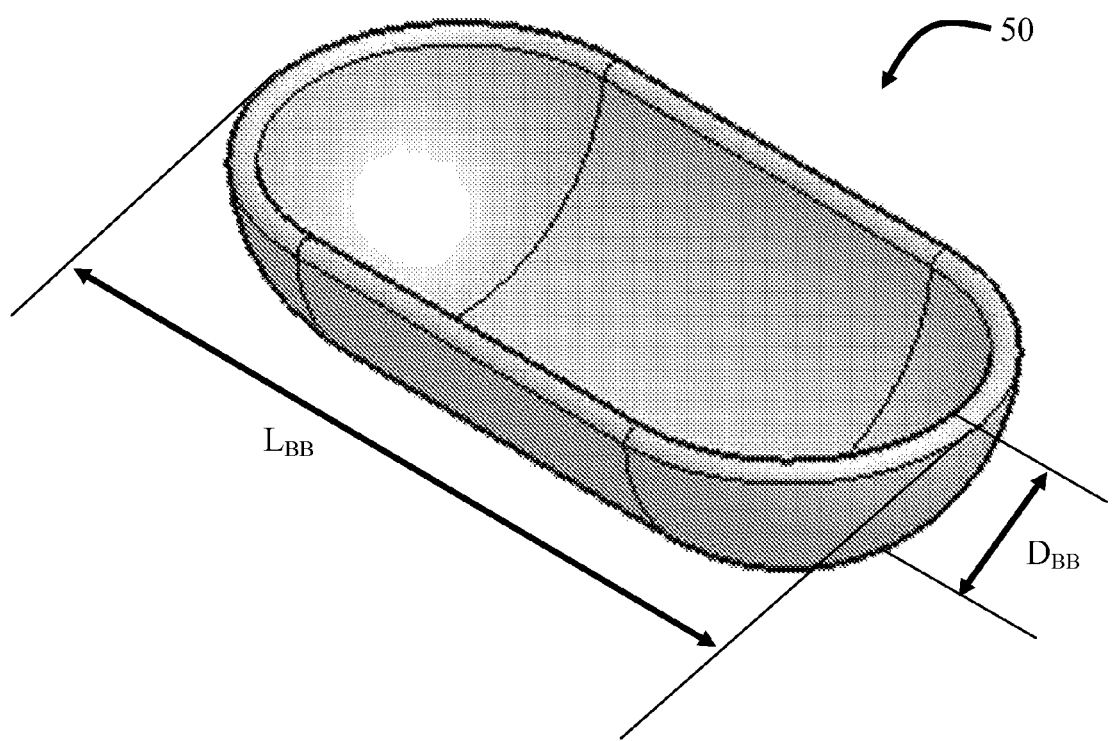
FIG. 20 shows a perspective view of a bacillus bacteria model.

FIG. 20 shows a perspective view of a bacillus bacteria model 50 from FIG. 2. The bacillus bacteria model 50 has a length "$L_{BB}$" of about 2 inches to about 8 inches, and preferably about 4 inches. The bacillus bacteria model 50 has a depth of about ½ inch to about 2 inches, and preferably about 1 inch.

Figure 21:
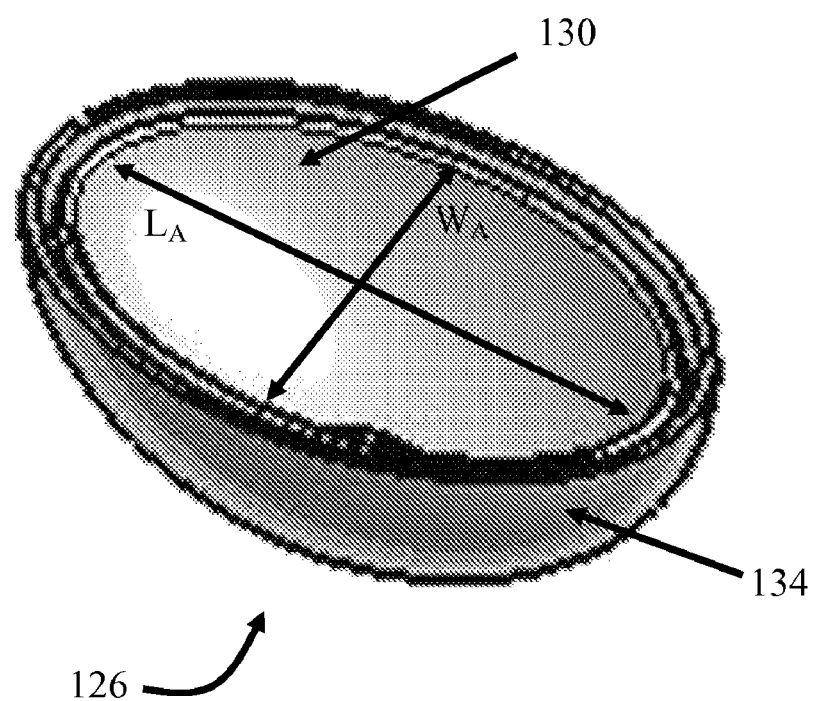
FIG. 21 shows a perspective view of an amyloplast and chromoplast model.
Figure 22:
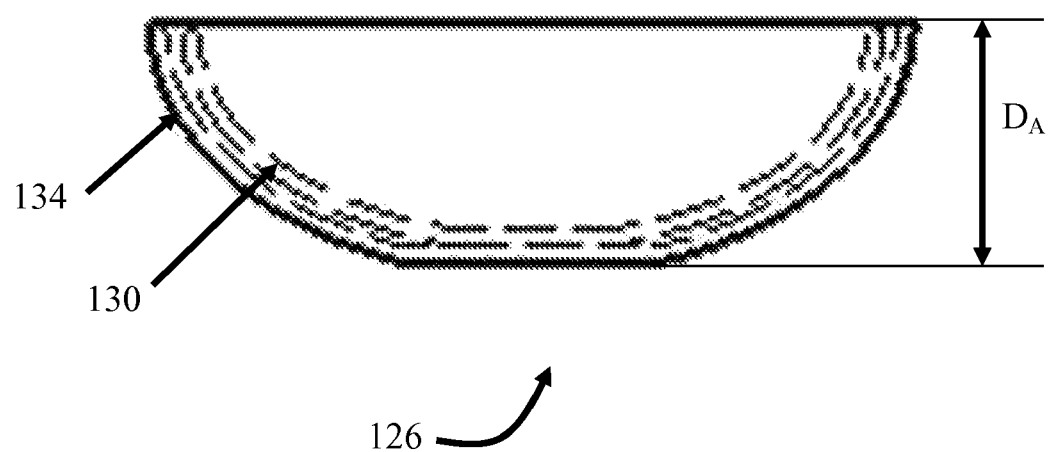
FIG. 22 shows a cross-sectional view of the amyloplast and chromoplast model from FIG. 21.

FIG. 21 shows a perspective view of an amyoplast model 126. FIG. 22 shows a cross-sectional view of the amyoplast model 126. The amyoplast model comprises an inner shell 130 and an outer shell 134. The amyoplast model has a length "$L_A$" of about 3 inches to about 12 inches, and preferably about 6 inches, and a width "$W_A$" of about 2 inches to about 8 inches and preferably about 4 inches, and a depth "$D_A$" of about 1 inch to about 4 inches, and preferably about 2 inches. The inner shell is configured to removeably snap 130 into the outer shell 134.

Figure 23:
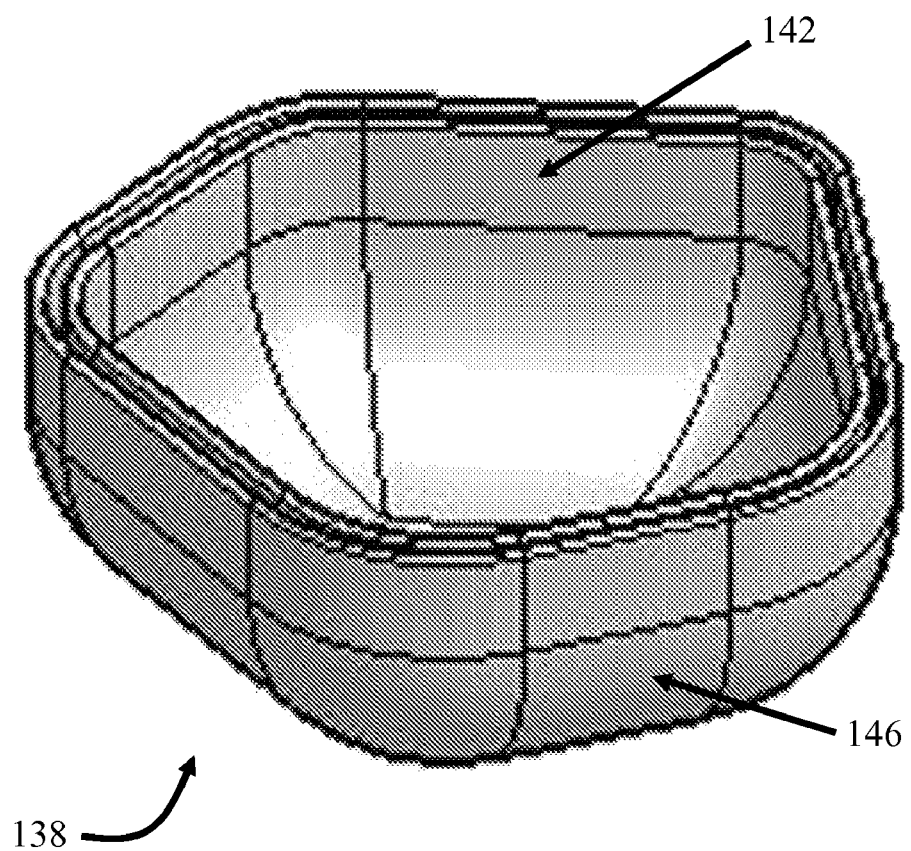
FIG. 23 shows a perspective view of a differently-shaped, larger amyloplast model.
Figure 24:
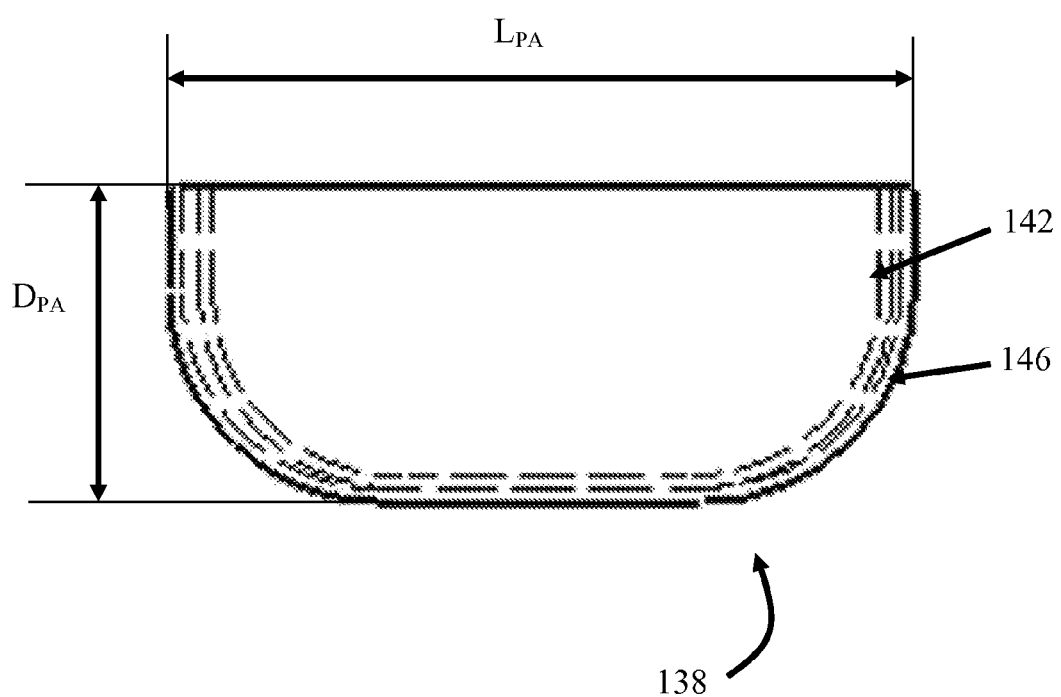
FIG. 24 shows a cross-sectional view of the amyoplast model.

FIG. 23 shows a perspective view of a pentagonal shaped amyoplast model 138. FIG. 24 shows a cross-sectional view of the amyoplast model 138. The pentagonal shaped amyoplast model 138 comprises an inner shell 142 and an outer shell 146. The pentagonal shaped amyoplast model 138 has a length "$L_{PA}$" of about 3 inches to about 14 inches, and preferably about 7 inches and a depth "$D_{PA}$" of about 1 inch to about 6 inches, and preferably about 3 inches. The inner shell 142 is configured to removeably snap into the outer shell 146.

The organelles and other cell structures described with respect to FIGS. 1 through 24 are not an exhaustive list. Any organelle and cell structure that may be modeled in a plastic material for tactile and interactive use by students are encompassed by this patent application. Additionally, cell membrane and vacuoles may be made out bendable wire covered in a plastic material or fabric. The plastic material may be any of a number of suitable materials including, but not limited to: nylon, foam, polycarbonate, and PVC. Additionally, instead of a plastic material, other material may be suitable for the organelle and cell structures, such other materials include, but are not limited to: foam and rubber. Finally, the concept for these models could also be worked into multimedia methods, for individual use or presentation on a computer.

Each organelle model both generally feels and generally looks like the appropriate organelle. Each organelle may be individually maneuverable such that students can put the cell components together to represent each specific cell type viewed under the microscope. In this manner, students can manipulate the models while they are viewing a particular cell in the microscope in order to better understand the cell and organelles.

The models are configured to make the abstract appearance of cells in the microscope more tangible for students. When students who are just starting to view cells try these models, they may find it challenging to arrange the organelles properly. But as they continue to do this (and to correct each other), they begin to "get it". They begin to know what they are supposed to be seeing. Then they can go back to the microscope and not only see what they are supposed to see but also feel confident in their viewing. They learn all about the cells they see and other cells by manipulating these models. They also learn to distinguish the organelles visible in the light microscope in lab from those only visible with electron microscopy. Even more satisfying is that they enjoy the hands-on approach that the models offer.

The disclosed invention may be offered in kits. The kits are configured to help students with what they typically see in the lab under the light microscope; help students understand how even the smallest cellular components (visible under the electron microscope) carry out the tasks the cell undergoes; and help students understand single-celled protists. Each kit could be used independently, and teachers could use one or all three depending on their curriculum needs. The kits would contain plastic models and bendable wire cell membranes and vacuoles, all packed in a drawstring bag, making them readily portable from classroom to classroom. The wires would be of two types—a thicker wire for cell walls and a thinner wire for cell membranes, including vacuolar membranes.

TABLE 1

Description of the three Dynamic Cell Model kit components.

| Kit One: Cells as viewed through the light microscope (kit for prototyping with NSF funds) | Kit Two: Cells as viewed through the electron microscope (for possible prototyping as funds allow) | Kit Three: Protists |
|---|---|---|
| cell membrane | cell membrane | cell membrane |
| cell wall | cell wall | ciliated cell membrane |
| central vacuole membrane | nucleus | 2 flagellar attachments for cell membrane |
| nucleus | rough endoplasmic reticulum | |
| 8 chloroplasts | smooth endoplasmic reticulum | cell wall |
| 8 amyloplasts | 6 mitochondria | nucleus/macronucleus |
| 8 chromoplasts | Golgi complex | micronucleus |
| 16 bacteria (8 coccus and 8 *bacillus*) | 3 lysosomes | 2 contractile vacuoles |
| | 9 vesicles | 6 chloroplasts |
| | | eye spot |
| | | 6 food vacuoles |

The potential end users for these kits include all educational institutions with the initial target being secondary and postsecondary organizations. The potential also exists for their application in museums and informal science education settings. The disclosed models are unique and consistent with current research on teaching and learning; there are no models currently available for teaching about cells that are so dynamic and versatile. Advantages of the disclosed models include: tactile, hands-on approach to learning appeals to individuals who learn best by manipulating objects; developed specifically for teaching and learning about cells in both lab and lecture settings; the models offer students with disabilities a way to learn about cells (e.g., a blind student can use them as tactile models even though they could not view the cells through a microscope); the models are engaging, interactive, and can reflect hundreds of cell types; since there may be a plurality of kits available, a school would only have to buy the kits that relate to their aspects of interest; the models are lightweight and portable, for convenience in carrying from room-to-room. Additionally, the organelles may be colorful, and may generally be the same color as may be seen under a microscope, or may colored according to the category of organelle, or may be colored in a fanciful fashion.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A tactile biological cell model kit comprising:
   a cell membrane model;
   a cell wall model;
   a central vacuole membrane model;
   a nucleus model;
   a plurality of chloroplast models;
   a plurality of amyloplast models;
   a plurality of chromoplast models;
   a plurality of coccus bacteria models;
   a plurality of bacillus bacteria models; and
   wherein each of the models are configured to be manipulated by hand and arranged on a generally flat surface with respect to each other so as to represent the arrangement of a plurality of organelles of an actual biological cell.

2. A tactile biological cell model kit comprising:
   a plurality of organelle models;
   wherein each of the organelle models are configured to be manipulated by hand and arranged on a generally flat surface with respect to each other so as to represent the arrangement of a plurality of organelles of an actual biological cell, and wherein each of the organelle models comprise:
   a cell membrane model;
   a cell wall model;
   a central vacuole membrane model;
   a nucleus model;
   a plurality of chloroplast models;
   a plurality of amyloplast models;
   a plurality of chromoplast models;
   a plurality of coccus bacteria models; and
   a plurality of bacillus bacteria models.

3. A tactile biological cell model kit comprising:
   a plurality of organelle models;
   wherein each of the organelle models are configured to be manipulated by hand and arranged on a generally flat surface with respect to each other so as to represent the arrangement of a plurality of organelles of an actual biological cell, and wherein each of the organelle models comprise:
   a cell membrane model;

a cell wall model;
a nucleus model;
a rough endoplasmic reticulum model;
a smooth endoplasmic reticulum model;
a plurality of mitochondria models;
a Golgi complex model;
a plurality of lysosome models; and
a plurality of vesicle models.

\* \* \* \* \*